March 29, 1949.   C. C. GRAVESEN   2,465,799
METHOD OF COATING OR ENCASING SUBSTANTIALLY
CYLINDRICAL OBJECTS BY A PRESSURE
MOLDING PROCESS
Filed Dec. 29, 1945
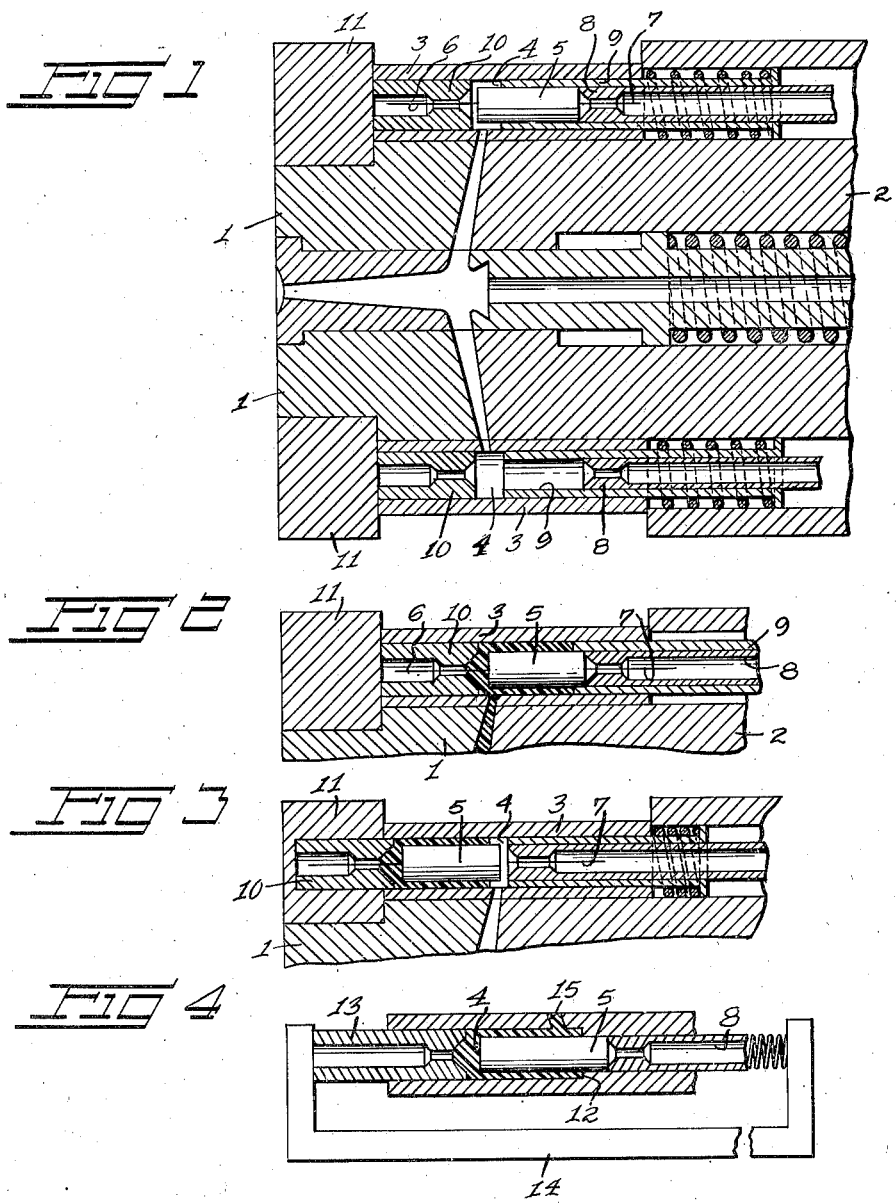
INVENTOR.
Carl Christian Gravesen
BY
Young, Emery + Thompson
Attys.

Patented Mar. 29, 1949

2,465,799

UNITED STATES PATENT OFFICE 2,465,799

METHOD OF COATING OR ENCASING SUBSTANTIALLY CYLINDRICAL OBJECTS BY A PRESSURE MOLDING PROCESS

Carl Christian Gravesen, Copenhagen, Denmark

Application December 29, 1945, Serial No. 638,282
In Denmark January 5, 1945

7 Claims. (Cl. 18—59)

The present invention relates to a method of coating or encasing substantially cylindrical objects, such as electric condensers or resistances, by a pressure moulding process.

The invention has for its purpose to devise a method by which the objects may be finished in one single operation or successive operations in one and the same mould cavity, so that the objects leave the said mould cavity fully embedded in the moulding material or in other words coated with the moulding material (such as plastics) not only on their circumferential surface, but also on their end surfaces, and without moulding fins, dead head residues, etc., to be subsequently removed.

To this end, according to the invention, the method comprises the steps of introducing an object into a substantially cylindrical mould cavity so as to project from one end of same with its front end, admitting moulding material under pressure to the mould cavity, causing a relative movement of the object out of said end, and causing the object and the other end of the cavity to be axially displaced relatively to the wall of the cavity.

Two different methods of carrying out the invention will now be described with reference to the accompanying drawing, in which Fig. 1 is a longitudinal section through a mould for use in one method of carrying out the invention, Fig. 2 is a longitudinal section of the mould with the parts in another position, Fig. 3 is a longitudinal section of the mould with the parts in a different position, and Fig. 4 is a longitudinal section through a mould for use in another method of carrying out the invention.

All the figures are to be understood as diagrammatic representations, only showing such details as are necessary for understanding the invention.

In Fig. 1, 1 represents a cylindrical block adapted to be attached to one mould carrier of a pressure moulding machine (not shown), while 2 represents a cylindrical block adapted to be attached to the other mould carrier of the machine. Around the block 2 there is attached a ring shaped member 3 extending beyond the front end of the block 2 so that, when the two mould carriers are moved towards each other, it will receive the block 1 in its interior. In the ring shaped member 3 a number of circumferentially spaced mould cavities 4 are provided, each serving to receive one object, so that a number of objects are coated in one and the same operation. It is of course immaterial whether, as in the case described, a number of objects or only a single object is treated in one operation, and therefore, in the following, reference will only be made to the mould cavity shown at the top of Fig. 1, and only this mould cavity is shown in Figs. 2 and 3.

An object 5 to be coated or encased is introduced into the mould cavity as shown. The object 5 may be a condenser with conductors 6 and 7. At one or its rear end the object 5 abuts a piston 8 and is together with the latter received in a tubular member 9 holding the object in a central position and forming one end surface of the mould cavity. This tubular member will in the following be referred to as the end guide. The other end of the mould cavity is a stopper, or plug 10 abutting against a ring member 11 attached to the block 1, so that during the moulding operation it will form a rigid end member of the mould cavity. The stopper 10 and the piston 8 are shaped in accordance with the desired shape of the end surfaces of the casing and in the example shown they have passages for receiving the conducting wires 6 and 7.

At the beginning of the operation the parts will assume the position shown in Fig. 1, and the moulding material is forced into the cavity formed by the stopper 10, the object 5, the end guide 9 and the member 3. Thereby one end of the object is encased, and under the influence of the pressure of the moulding mass the guide 9 is forced back or to the right, Fig. 1, while at the same time the moulding material gradually penetrates forwards along the side of the object 5, Fig. 2. As is apparent, the object is now supported in practically its whole length in the moulding material, and will remain supported, because the moulding mass deposited around the object will gradually support the object so as to replace the support of the guide 9.

When the guide 9 has been forced back to the position shown in Fig. 2, it is stopped by means not shown, whereby this moulding operation is brought to an end.

The method is now continued in the following manner. The two mould carriers, not shown, are separated from each other whereby the moulding material in the inlet is carried along with the block 2. During the withdrawal movement of the latter, the piston 8 and the guide 9 will engage with abutments (not shown) whereby they will push the object 5 and the casing moulded around the latter forward or to the left, Fig. 3, the plug 10 abutting no longer against the ring member 11 and therefore is free to move. Hereby the moulding material in the inlet is cut off from the moulded casing and is thereafter removed by being expelled in the axial direction in known manner. After the piston 8 and the guide 9 have pushed the object 5 and the moulded casing surrounding same to the position shown in Fig. 3, these members 8 and 9 are again withdrawn slightly to the right to the position shown in Fig. 3. This may take place resiliently and limited by abutments, but the drawing does not show any of the means causing the desired movements of the different parts, since such means may be of well known type and do not form part of the invention. When the mould carriers are again moved towards one another, the ring member 11 has been turned to such a position that the plug 10 may now enter into a recess in the member 11 and is thereby supported in its new position. As shown in Fig. 3 the inlet of the mould cavity is now located behind the cylindrical casing moulded around the object 5 by which casing the object is held in a central position, so that when moulding material is now again forced into the mould cavity, Fig. 3, the rear portion of the object will be encased.

The mould carriers are now again separated from one another and the finished object is axially expelled, whereby the new moulding material in the inlet is cut off so that the object is completely finished when leaving the mould. The dead head is thereafter expelled in the same manner as after the first moulding operation.

In Fig. 4 a mould is shown having a fixed end guide constituted by one end surface 12 of the mould cavity, in which end the object is slidably mounted. Also in this case one end of the object 5 abuts a slidable piston 8. The other end of the mould cavity is constituted by a displaceable stopper or plug 13, which is coupled to the piston 8 as diagrammatically indicated by the U-shaped member 14. The inlet 15 to the mould cavity is arranged near the fixed end 12.

When the moulding material is admitted through the inlet 15 it exerts a certain pressure on the stopper 13 and a pressure in the opposite direction on the object 5. The former pressure is greater than the latter because it acts on a greater area. A resulting force towards the left will therefore act on the assembly consisting of the stopper 13, the member 14, the piston 8 and the object 5, thereby pushing the assembly towards the left so that the object 5 will gradually slide out of the guide 12.

When the object 5 has left the bottom guide, the movement of the displaceable assembly is stopped, by the member 14 striking an abutment not shown. The piston 8 is now released so that it may be pushed a little back whereby moulding material is admitted behind the rear end of the object, thus completing the encasing. The releasing of the piston may take place in various ways. The piston may be displaceable relatively to the member 14 against the action of a spring which is strong enough to transmit the necessary force for pushing the object 5 out of the bottom guide, but gives way and permits the piston 8 to move backwards to the necessary extent, when the member 14 is stopped and the moulding material penetrates behind the object and acts on the front end of the piston 8 with its full pressure. Instead of a spring arrangement of the kind described there may be used a releasing device which is caused to operate when the member 14 strikes an abutment and is thereby stopped.

After the moulding operation has come to an end, the encased object is expelled in an axial direction. This will cause the moulding material in the inlet to be cut off, so that the object will be altogether finished when leaving the mould cavity.

Although, in all embodiments of the invention it is preferred that the said relative movements of the different members should take place under the influence of the pressure of the moulding material, provision may, if desired, be made for an enforced movement of the said members.

Having now particularly described and ascertained the nature of my invention and in what manner the same is to be performed, I declare that what I claim is:

1. A method of coating or encasing substantially cylindrical objects by a pressure moulding process comprising the steps of introducing an object into a substantially cylindrical mould cavity so as to project from one end surface of the cavity thereby leaving a space between one end of the object and the other end surface of the mould cavity, admitting mouldng material under pressure to the mould cavity including the space between the said end of the object and the said other end surface of the mould cavity, causing a relative movement of the object into the mould cavity while continuously admitting moulding material to the emerging surface portions of the object thereby causing the object and the first-mentioned end surface of the cavity to be axially displaced relatively to the substantially cylindrical wall of the cavity, and thereafter causing moulding material to penetrate behind the other end of the object.

2. A method of coating or encasing substantially cylindrical objects by a pressure moulding process comprising the steps of introducing an object into a substantially cylindrical mould cavity so as to project from one end surface of the cavity thereby leaving a space between one end of the object and the other end surface of the mould cavity, admitting moulding material under pressure to the mould cavity including the space between the said end of the object and the said other end surface of the mould cavity, causing a relative movement of the object into the mould cavity while continuously admitting moulding material to the emerging portions of the object thereby causing the object and the first-mentioned end surface of the cavity to be axially displaced relatively to the wall of the cavity, stopping the admission of moulding material to the mould cavity, and again admitting moulding material to the mould cavity in such a manner as to cause said moulding material to coat the other end of the object.

3. A method of coating or encasing substantially cylindrical objects by a pressure moulding process comprising the steps of introducing an object into a substantially cylindrical mould cavity so as to project from one end surface of the cavity thereby leaving a space between one end of the object and the other end surface of the mould cavity, admitting moulding material under pressure to the mould cavity including the space between the said end of the object and the said other end surface of the mould cavity so as to form a coating around the projecting end of the object, while at the same time causing a relative movement of the object into the mould cavity and continuously admitting moulding material to the emerging surface portions of the object, stopping the admission of moulding material to the mould cavity, causing the object and the first-mentioned end surface of the cavity to be axially displaced relatively to the wall of the cavity, and again admitting moulding material to the mould cavity so as to form a coating around the other end of the object.

4. A method of coating or encasing substantially cylindrical objects by a pressure moulding process comprising the steps of introducing an object into a substantially cylindrical mould cavity so as to project from one end surface of the cavity thereby leaving a space between one end of the object and the other end surface of the mould cavity, coupling the object to the slidable end surface of the mould cavity by coupling means located outside the mould cavity, admitting moulding material under pressure to the mould cavity including the space left between the one end of the object and the said slidable end surface of the mould cavity, while at the same time causing the object and the slidable end surface as an assembly to be axially displaced in the mould cavity, such displacing being continued until the object has fully emerged from the first-mentioned end surface and the moulding material has penetrated the other end of the object.

5. A method of coating or encasing substantially cylindrical objects by a pressure moulding process comprising the steps of introducing an object into a substantially cylindrical mould cavity so as to project from one end surface of the cavity thereby leaving a space between one end of the object and the other slidable end surface of the mould cavity, coupling the object to the slidable end surface of the mould cavity by coupling means located outside the mould cavity, admitting moulding material under pressure to the mould cavity including the space left between the said end of the object and the said slidable end surface of the mould cavity, while at the same time causing the object and the slidable end surface as an assembly to be axially displaced in the mould cavity by the differential pressure of the moulding material on the object and on the slidable end surface respectively, such displacing movement continuing until the object has fully emerged from the first-mentioned end surface and the moulding material has penetrated behind the other end of the object.

6. A method of coating or encasing substantially cylindrical objects by a pressure moulding process comprising the steps of introducing an object into a substantially cylindrical mould cavity so as to project from one fixed end surface of the cavity relative to the other slidable end surface of the mould cavity and at its rear end to be axially supported by a supporting member, coupling the supporting member to the slidable end surface of the mould cavity by means located outside the mould cavity, admitting moulding material under pressure to the mould cavity including the space left between the end of the object and the slidable end surface of the mould cavity, causing the object, the supporting member and the slidable end surface as an assembly to be axially displaced in the mould cavity while continuously admitting moulding material to the latter, stopping the movement of the said assembly, and permitting a limited rearward movement of the supporting member so as to allow moulding material to penetrate behind the other end of the object.

7. A method of coating or encasing substantially cylindrical objects by a pressure moulding process comprising the steps of introducing an object into a substantially cylindrical mould cavity so as to project from one end surface thereof a distance from the other slidable end surface of the mould cavity and at its rear end to be axially supported by a supporting member, coupling the supporting member to the slidable end surface of the mould cavity by means located outside the mould cavity, admitting moulding material under pressure to the mould cavity including the space left between the end of the object and the slidable end surface of the mould cavity, thereby at the same time causing the object, the supporting member and the slidable end surface as a unit to be axially displaced in the mould cavity by the differential pressure of the moulding material on the object and on the slidable end surface respectively, stopping the movement of the said unit, and permitting a limited rearward movement of the supporting member so as to allow moulding material to penetrate behind the other end of the object.

CARL CHRISTIAN GRAVESEN.

REFERENCES CITED

The following references are of record in the file of this patent:

UNITED STATES PATENTS

| Number | Name | Date |
| --- | --- | --- |
| 391,198 | Chapuis | June 15, 1943 |

FOREIGN PATENTS

| Number | Country | Date |
| --- | --- | --- |
| 388,662 | Great Britain | Mar. 2, 1933 |